United States Patent
Tao et al.

(10) Patent No.: US 10,313,007 B2
(45) Date of Patent: Jun. 4, 2019

(54) SYSTEM PERFORMANCE PREDICTION METHOD AND APPARATUS

(71) Applicant: Fujitsu Limited, Kawasaki-shi, Kanagawa (JP)

(72) Inventors: Zhenning Tao, Beijing (CN); Ying Zhao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/729,008

(22) Filed: Oct. 10, 2017

(65) Prior Publication Data

US 2018/0102841 A1    Apr. 12, 2018

(30) Foreign Application Priority Data

Oct. 10, 2016  (CN) .......................... 2016 1 0884590

(51) Int. Cl.
*H04B 10/25*    (2013.01)
*H04B 10/40*    (2013.01)
(Continued)

(52) U.S. Cl.
CPC ..... *H04B 10/07953* (2013.01); *H04B 10/073* (2013.01); *H04B 10/07955* (2013.01); *H04B 10/25* (2013.01); *H04B 10/079* (2013.01); *H04B 10/0795* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | |
|---|---|---|
| 2004/0125435 A1 | 7/2004 | Liu et al. |
| 2004/0184802 A1 | 9/2004 | Xu |
| (Continued) | | |

FOREIGN PATENT DOCUMENTS

| | | |
|---|---|---|
| CN | 1481084 | 3/2004 |
| CN | 1533058 | 9/2004 |
| CN | 105281828 | 1/2016 |

OTHER PUBLICATIONS

Shoichiro Oda, et al., "Demonstration of an Autonomous, Software Controlled Living Optical Network that Eliminates the Need for Pre-planning", 2016, 3 pages.
(Continued)

*Primary Examiner* — Darren E Wolf
(74) *Attorney, Agent, or Firm* — Staas & Halsey LLP

(57) ABSTRACT

A system performance prediction method and apparatus where the transmission system performance prediction apparatus includes: a calculating unit configured to calculate system performance at second power according to first power of a signal and a first noise component generated by the system at the first power. With the above system performance prediction apparatus, by changing power and predicting the system performance by using noise components at different power, accuracy of the prediction of the system performance may be improved, and problems in the related art may be avoided that in predicting system performance, a large-capacity database needs to be prepared and accuracy of the prediction of the system performance is low.

15 Claims, 3 Drawing Sheets

(51) Int. Cl.
  *H04B 10/50* (2013.01)
  *H04B 10/60* (2013.01)
  *H04B 10/073* (2013.01)
  *H04B 10/079* (2013.01)

(56) References Cited

U.S. PATENT DOCUMENTS

2011/0122787 A1* 5/2011 Wang .................... H04L 1/20
                                                    370/252
2016/0323900 A1* 11/2016 De Domenico ..... H04B 17/318
2017/0285207 A1* 10/2017 Shao ........................ G01V 3/02
2017/0351241 A1* 12/2017 Bowers ................ G05B 19/406

OTHER PUBLICATIONS

Wei-xiong Wang, et al., "Study on nonlinear phase noise in quasi-linear optical transmission systems", Oct. 2014, 3 pages.

* cited by examiner

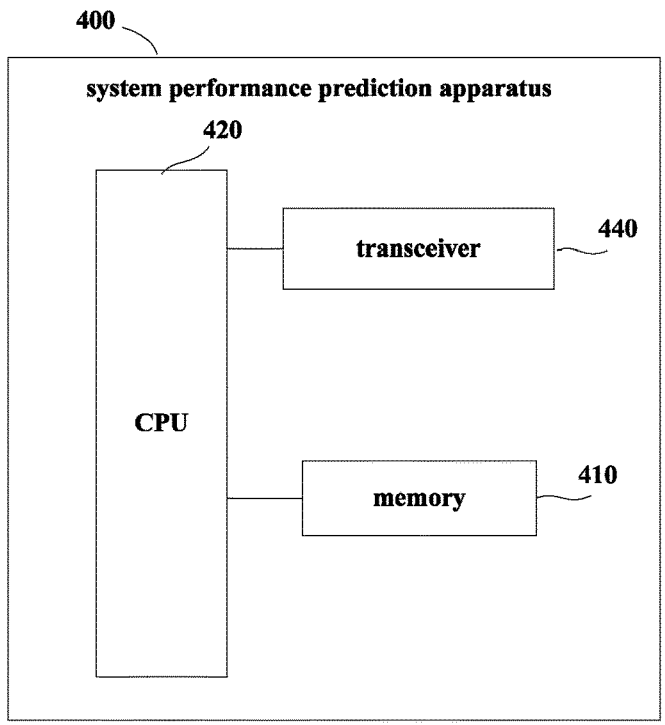

FIG. 4

501 system performance at second power is calculated according to first power of a signal and a first noise component generated by the system at the first power

FIG. 5

601 at least one second noise component is calculated at the second power according to the first power of the signal and at least one first noise component at the first power

602 the system performance at the second power is calculated according to the at least one second noise component

FIG. 6

SYSTEM PERFORMANCE PREDICTION METHOD AND APPARATUS

CROSS-REFERENCE TO RELATED APPLICATIONS

This application claims the benefit of Chinese Application No. 201610884590.8, filed Oct. 10, 2016, in the Chinese Intellectual Property Office, the disclosure of which is incorporated herein by reference.

BACKGROUND

1. Field

This disclosure relates to the field of communications technologies, and in particular to a system performance prediction method and apparatus.

2. Description of the Related Art

Communications networks are more and more dynamic as demands for communications network transmission are more and more dynamic. In comparison with a legacy static network, a dynamic network is needed to be able to predict performance of an optical transmission system, that is, before an actual change of the optical transmission system, whether the change of the system is appropriate may be prejudged by predicting system performance after the change of the optical transmission system.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

An existing system performance prediction method shall be described below. Assuming that noises of a transmission system are all additive noises, a database is established in advance, and various transmission links and corresponding noises are stored. In actually performing system performance prediction, an actual transmission link is constituted by which transmission links stored in the database is judged first, noises to which the transmission links correspond are determined, and noises to which the transmission links constituting the actual transmission link correspond are summed up, so as to obtain a total noise of the actual transmission link; and then the system performance is predicted according to the total noise. However, summation of the noises of the transmission links on which the method relies is too simple, and such cases as nonlinear distortion, etc., cannot be dealt with, resulting in that accuracy of the system performance prediction is relatively low.

Embodiments of this disclosure provide a system performance prediction method and apparatus, in which by changing power and predicting the transmission system performance by using noise components at different power, accuracy of the prediction of the system performance may be improved, and problems in the related art may be avoided that in predicting system performance, a large-capacity database needs to be prepared and accuracy of the prediction of the system performance is low.

The above object of the embodiments of this disclosure is achieved by the following technical solutions.

According to a first aspect of the embodiments of this disclosure, there is provided a system performance prediction apparatus, including:

a calculating unit or calculator configured to calculate system performance at second power according to first power of a signal and a first noise component generated by the system at the first power.

According to a second aspect of the embodiments of this disclosure, there is provided a system performance prediction method, including:

calculating system performance at second power according to first power of a signal and a first noise component generated by the system at the first power.

An advantage of the embodiments of this disclosure exists in that accuracy of the prediction of the system performance may be improved, and problems in the related art may be avoided that in predicting system performance, a large-capacity database needs to be prepared and accuracy of the prediction of the system performance is low.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in at least one embodiment.

In the drawings:

FIG. 4 is a schematic diagram of a hardware structure of a system performance prediction apparatus of Embodiment 3;

FIG. 5 is a flowchart of a system performance prediction method of Embodiment 4; and FIG. 6 is a flowchart of step 501 in Embodiment 4.

DETAILED DESCRIPTION

These and further aspects and features of the present disclosure will be apparent with reference to the following description and attached drawings. The implementations are illustrative only, and are intended to limit this disclosure. For the principle and implementations of this disclosure to be easily understood by those skilled in the art, the embodiments of this disclosure shall be described taking an optical transmission system as an example. However, it should be understood that the embodiments of this disclosure are not limited to an optical transmission system.

The implementations of this disclosure shall be described below in detail with reference to the accompanying drawings.

Embodiment 1

Figure 1:
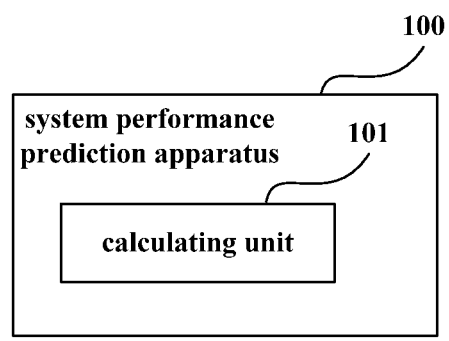
FIG. 1 is a schematic diagram of a system performance prediction apparatus of Embodiment 1.

Embodiment 1 provides a system performance prediction apparatus. FIG. 1 is a schematic diagram of the system performance prediction apparatus. As shown in FIG. 1, the apparatus 100 includes:

a calculating unit 101 configured to calculate system performance at second power according to first power of a signal and a first noise component generated by the system at the first power.

It can be seen from the above embodiment that by changing power and predicting the system performance by using noise components at different power, accuracy of the prediction of the system performance may be improved, and problems in the related art may be avoided that in predicting system performance, a large-capacity database needs to be prepared and accuracy of the prediction of the system performance is low.

Figure 2:
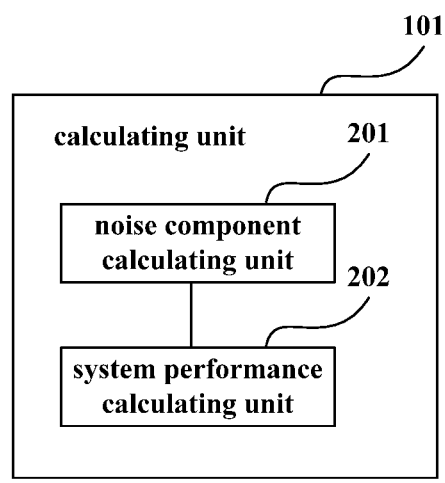
FIG. 2 is a schematic diagram of a structure of a calculating unit 101 of Embodiment 1.

FIG. 2 is a schematic diagram of a structure of the calculating unit 101 of this embodiment. As shown in FIG. 2, the calculating unit 101 includes:

a noise component calculating unit 201 configured to calculate at least one second noise component at the second power according to the first power of the signal and at least one first noise component at the first power; and a system performance calculating unit 202 configured to calculate the system performance at the second power according to the at least one second noise component.

In this embodiment, noise analysis is performed on the signal at the first power, so as to obtain magnitudes of various types of noises (at least one first noise component); and by predicting magnitudes of various types of noises (at least one second noise component) at the second power, system performance may be predicted according to the at least one second type of noise, which may improve accuracy of prediction of the system performance, and avoid problems in the related art that in predicting system performance, a large-capacity database needs to be prepared and accuracy of the prediction of the system performance is low.

In this embodiment, the at least one first noise component and the at least one second noise component include a linear noise component, a nonlinear noise component, and/or a constant noise component. That is, when the first noise components and the second noise components are linear noise components, the first noise components at different power and the second noise components at different power are linear with respect to each other, when the first noise components and the second noise components are nonlinear noise components, the first noise components at different power and the second noise components at different power are nonlinear with respect to each other, and when the first noise components and the second noise components are constant noise components, the first noise components at different power and the second noise components at different power are identical to each other; in the embodiment, numbers and types of the first noise components and the second noise components are identical.

In this embodiment, a quantitative relationship between the first noise component and the second noise component may be determined according to values of the first power and the second power. Hence, the noise component calculating unit 201 may determine the at least one second noise component according to the at least one first noise component and the quantitative relationship between the first noise component and the second noise component determined according to the first power and the second power.

In this embodiment, the system performance may be expressed by a signal to noise ratio, or a bit error rate, or a Q value (a quality value). When the system performance is a signal to noise ratio, the system performance calculating unit 202 takes a ratio of the second power to a sum of at least one second noise component obtained by the noise component calculating unit 201 through calculation as the signal to noise ratio, thereby obtaining the system performance.

In an implementation, when the system performance is a bit error rate or a Q value, the system performance calculating unit 202 may obtain a signal to noise ratio (SNR) of the system through calculation, and then calculate the bit error rate (BER) or the Q value according to the signal to noise ratio; in the embodiment, the related art may be referred to for a calculation method of the BER or the Q value, and following formulae (1) and (2) may be employed to calculate the BER or the Q value:

$$BER_{MQAM} \approx \frac{2}{\log_2 M}\left(1 - \frac{1}{\sqrt{M}}\mathrm{erfc}\left(\sqrt{\frac{3}{2(M-1)} \times SNR}\right)\right); \quad (1)$$

where, MQAM denotes multiple quadrature amplitude modulation signals of M constellation points, M being greater than or equal to 2;

$$BER = \frac{1}{2}\mathrm{erfc}\left(\frac{Q}{\sqrt{2}}\right); \quad (2)$$

where, erfc denotes a Gaussian error function, $$\mathrm{erfc}(x) = \frac{2}{\sqrt{\pi}} \int_x^\infty e^{-\eta^2} d\eta.$$

With the above apparatus of this embodiment, by changing power and predicting the system performance by using noise components at different power, accuracy of the prediction of the system performance may be improved, and problems in the related art may be avoided that in predicting system performance, a large-capacity database needs to be prepared and accuracy of the prediction of the system performance is low.

Embodiment 2

In Embodiment 2, calculation of the system performance of an optical transmission system by the system performance prediction apparatus of this disclosure shall be described by taking the optical transmission system as an example.

Figure 3:
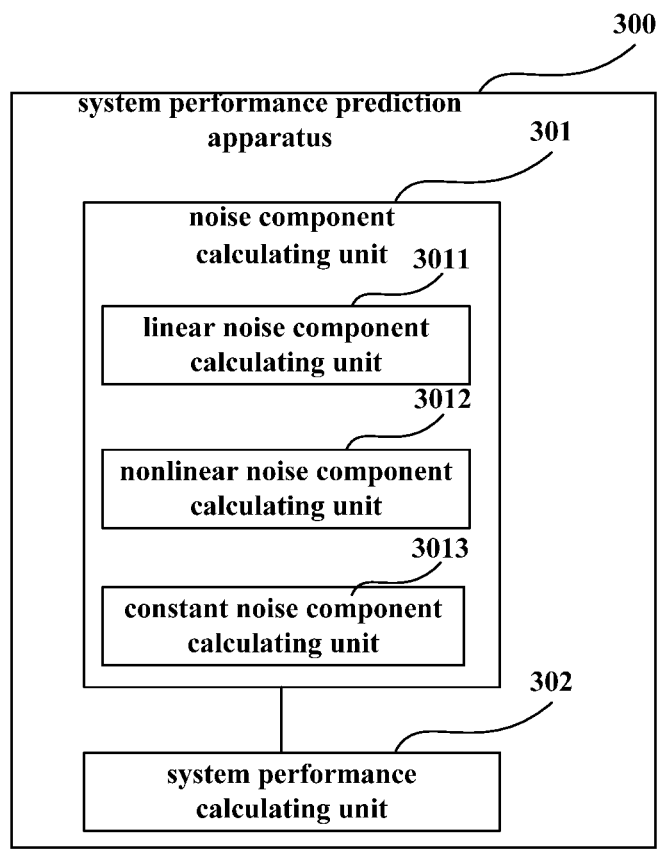
FIG. 3 is a schematic diagram of a system performance prediction apparatus of Embodiment 2.

Embodiment 2 provides a system performance prediction apparatus. FIG. 3 is a schematic diagram of the system performance prediction apparatus. As shown in FIG. 3, the apparatus 300 includes a noise component calculating unit 301 and a system performance calculating unit 302, implementations of which being identical to those of the noise component calculating unit 201 and the system performance calculating unit 202 in Embodiment 1, which shall not be described herein any further.

In this embodiment, when the system is an optical transmission system, as multiple types of noises, such as a transmitter noise, a receiver noise, an optical fiber transmission intra-channel nonlinear distortion, an optical fiber transmission inter-channel nonlinear distortion, a noise induced by an optical fiber transmission linear distortion, an amplified spontaneous emission noise, etc., are included in the optical transmission system, the system performance of the optical transmission system is a result of combined effects of multiple types of noises. For example, in predicting the system performance of the optical transmission system, it is taken into account that at least one noise component of a transmitter noise, a receiver noise, an optical fiber transmission intra-channel nonlinear distortion, an optical fiber transmission inter-channel nonlinear distortion, a noise induced by an optical fiber transmission linear distortion and an amplified spontaneous emission noise, are included in the optical transmission system, and the system performance of the optical transmission system under effects of the noise component is predicted.

With the above apparatus of this embodiment, by changing power and predicting the system performance by using noise components at different power, accuracy of the prediction of the system performance may be improved, and problems in the related art may be avoided that in predicting system performance, a large-capacity database needs to be prepared and accuracy of the prediction of the system performance is low due to that such multiple distortion as nonlinearity, etc., is not taken into account.

In this embodiment, the at least one first noise component and the at least one second noise component include a linear noise component, a nonlinear noise component, and/or a constant noise component. The types of noises in the optical transmission system shall be classified and described below.

In this embodiment, the linear noise component includes: a transmitter noise and a noise induced by an optical fiber transmission linear distortion; in the embodiment, as the optical fiber transmission linear distortion in an actual optical transmission system will be compensated for by digital signal processing by a receiver, in one implementation, the linear noise component may not include the noise induced by an optical fiber transmission linear distortion, and may only include the transmitter noise.

In this embodiment, the nonlinear noise component includes: a noise induced by an optical fiber transmission intra-channel nonlinear distortion and a noise induced by an optical fiber transmission inter-channel nonlinear distortion.

In this embodiment, in a case of wave-division multiplexing, a change of channel power has no effect on total input power of an optical amplifier, hence, noise power of the optical amplifier is not affected. Thus, the constant noise component includes: an amplified spontaneous emission noise.

In this embodiment, a relationship between changes of receiver noises at different power is related to types of parameters set by the receiver in the optical transmission system, that is, affected by the different types of parameters set by the receiver, the receiver noise may be a linear noise component or a nonlinear noise component or a constant noise component.

In this embodiment, the first power includes first base channel calibration power and first neighboring channel calibration power, and the second power includes second base channel power and second neighboring channel power. And the system performance prediction apparatus may further include an input unit (not shown) configured to input the first base channel calibration power, the first neighboring channel calibration power, the second base channel power, the second neighboring channel power and value of at least one first noise component at the first power.

A structure of the noise component calculating unit 301 and how to calculate the second noise component by the noise component calculating unit 301 according to the at least one first noise component, the first power and the second power shall be described below with reference to the accompanying drawings.

As shown in FIG. 3, the noise component calculating unit 301 may include one or more of a linear noise component calculating unit 3011, a nonlinear noise component calculating unit 3012 and a constant noise component calculating unit 3013. And the structure of the noise component calculating unit 301 is related to types of noises included in the at least one first noise component.

When the first noise component is a linear noise component, the noise component calculating unit 301 includes the linear noise component calculating unit 3011, which is configured to take a product of a ratio of the second base channel power to the first base channel calibration power and the first noise component as the second noise component;

When the first noise component is a nonlinear noise component, the noise component calculating unit 301 includes the nonlinear noise component calculating unit 3012, which is configured to take a product of a power of three of a ratio of the second base channel power to the first base channel calibration power and the first noise component as the second noise component when the first noise component is an optical fiber transmission intra-channel nonlinear distortion, take a product of a square of a ratio of the second neighboring channel power to the first neighboring channel calibration power and a ratio of the second base channel power to the first base channel calibration power and the first noise component as the second noise component when the first noise component is an optical fiber transmission inter-channel nonlinear distortion, and take a product of a power of $\alpha$ of a ratio of the second base channel power to the first base channel calibration power and the first noise component as the second noise component when the first noise component is a receiver noise; where, $\alpha$ is not 1 and 0;

And when the first noise component is a constant noise component, the noise component calculating unit 301 includes the constant noise component calculating unit 3013, which is configured to take the first noise component as the second noise component when the first noise component is a constant noise component.

In one implementation, when the system performance is a signal to noise ratio, the system performance calculating unit 302 takes a ratio of second base channel power to a sum of at least one second noise component as the signal to noise ratio; and in the embodiment, the second power includes the second base channel power and second neighboring channel power.

In one implementation, when the system performance is a bit error rate or a Q value, Embodiment 1 may be referred to for a calculation method thereof, which shall not be described herein any further.

How to calculate the various types of noises in the optical transmission system and how to predict the system performance shall be described below by way of examples.

In this embodiment, let the first power include first base channel calibration power $P_0$ and first neighboring channel calibration power $P_{neighbor0}$, the second power include second base channel power $P$ and second neighboring channel power $P_{neighbor}$, and the at least one first noise component and the at least one second noise component include a linear noise component, a nonlinear noise component, and a constant noise component. In the embodiment, the linear noise component at the first power includes a transmitter noise $N_{TX0}$ and an optical fiber transmission linear distortion $N_{Linear0}$; the nonlinear noise component at the first power includes an optical fiber transmission intra-channel nonlinear distortion $N_{intraNL0}$ and an optical fiber transmission inter-channel nonlinear distortion $N_{interNL0}$; the constant noise component at the first power includes an amplified spontaneous emission noise $N_{ASE0}$; the linear noise component at the second power includes a transmitter noise $N_{TX}$ and an optical fiber transmission linear distortion $N_{Linear}$; the nonlinear noise component at the second power includes an optical fiber transmission intra-channel nonlinear distortion $N_{intraNL}$ and an optical fiber transmission inter-channel nonlinear distortion $N_{interNL}$; and the constant noise component at the second power includes an amplified spontaneous emission noise $N_{ASE}$. Furthermore, in this embodiment, the at least one first noise component and the at least one second noise component may further include a receiver noise, and a relationship between a receiver noise $N_{RX0}$ at the first power and a receiver noise $N_{RX}$ at the second power is related to a parameter α set by the receiver in the optical transmission system. When α is 1, the receiver noise is a linear noise component; when α is 0, the receiver noise is a constant noise component; and when α is another value than 0 and 1, the receiver noise is a nonlinear noise component.

In this embodiment, by inputting the first base channel calibration power, the first neighboring channel calibration power, the second base channel power, the second neighboring channel power and the more than one first noise components $N_{TX0}$, $N_{Linear0}$, $N_{intraNL0}$, $N_{interNL0}$, $N_{ASE0}$ and $N_{RX0}$ at the first power, by the input unit (not shown) to the noise component calculating unit 301, the noise component calculating unit 301 calculates the more than one second noise components $N_{TX}$, $N_{Linear}$, $N_{intraNL}$, $N_{interNL}$, $N_{ASE}$ and $N_{RX}$ according to the first base channel calibration power $P_0$, the first neighboring channel calibration power $P_{neighbor0}$, the second base channel power $P$, the second neighboring channel power $P_{neighbor}$ and the more than one first noise components $N_{TX0}$, $N_{Linear0}$, $N_{intraNL0}$, $N_{interNL0}$, $N_{ASE0}$ and $N_{RX0}$ at the first power, with details being as follows:

$N_{TX}=P/P_0 \times N_{TX0}$; $N_{Linear}=P/P_0 \times N_{Linear0}$; $N_{intraNL}=(P/P_0)^3 \times N_{intraNL0}$;

$N_{interNL}=(P/P_0) \times (P_{neighbor}/P_{neighbor0})^2 \times N_{interNL0}$; $N_{ASE}=N_{ASE0}$;

$N_{RX}=(P/P_0)^\alpha \times N_{RX0}$.

And the system performance calculating unit 302 calculates the system performance according to the more than one second noise components $N_{TX}$, $N_{Linear}$, $N_{intraNL}$, $N_{interNL}$, $N_{ASE}$ and $N_{RX}$. For example, when the system performance is an SNR, the SNR is:

$$\frac{P}{\frac{P}{P_0}N_{TX} + \frac{P}{P_0}N_{Linear0} + \left(\frac{P}{P_0}\right)^\alpha N_{RX0} + N_{ASE0} + P^3 P_0^{-3} N_{intraNL0} + P^1 P_0^{-1} P_{neighbor}^2 P_{neighbor0}^{-2} N_{interNL0}} =$$

$$\frac{1}{\frac{1}{P_0}N_{TX0} + \frac{1}{P_0}N_{Linear0} + \frac{(P/P_0)^\alpha}{P}N_{RX0} + \frac{1}{P}N_{ASE0} + P^2 P_0^{-3} N_{intraNL0} + P_0^{-1} P_{neighbor}^2 P_{neighbor0}^{-2} N_{interNL0}}.$$

With the above apparatus of this embodiment, by changing power and predicting the system performance by using noise components at different power, accuracy of the prediction of the system performance may be improved, and problems in the related art may be avoided that in predicting system performance, a large-capacity database needs to be prepared and accuracy of the prediction of the system performance is low due to that such multiple distortion as nonlinearity, etc., is not taken into account.

Embodiment 3

Embodiment 3 provides a system performance prediction apparatus. FIG. 4 is a schematic diagram of a hardware structure of the system performance prediction apparatus of this embodiment. As shown in FIG. 4, the apparatus 400 may include an interface (not shown), a central processing unit (CPU) 420, a memory 410 and a transceiver 440, the memory 410 being coupled to the central processing unit 420. In the embodiment, the memory 410 may store various data, and furthermore, it may store a program for system performance prediction, execute the program under control of the central processing unit 420, and store various preset values and predetermined conditions, etc.

In one implementation, the functions of the system performance prediction apparatus may be integrated into the central processing unit 420. In the embodiment, the central processing unit 420 may be configured to: calculate system performance at second power according to first power of a signal and a first noise component generated by the system at the first power.

In the embodiment, the central processing unit 420 may be configured to: calculate at least one second noise component at the second power according to the first power of the signal and at least one first noise component at the first power, and calculate the system performance at the second power according to the at least one second noise component.

In the embodiment, the at least one first noise component and the at least one second noise component include a linear noise component, a nonlinear noise component, and/or a constant noise component.

In the embodiment, the linear noise component includes: a transmitter noise, or a transmitter noise and an optical fiber transmission linear distortion; the nonlinear noise component includes: an optical fiber transmission intra-channel nonlinear distortion and an optical fiber transmission inter-channel nonlinear distortion; and the constant noise component includes: an amplified spontaneous emission noise, or an amplified spontaneous emission noise and a receiver noise;

or, the linear noise component includes: a transmitter noise and a receiver noise, or a transmitter noise, a receiver noise and an optical fiber transmission linear distortion; the nonlinear noise component includes: an optical fiber transmission intra-channel nonlinear distortion and an optical fiber transmission inter-channel nonlinear distortion; and the constant noise component includes: an amplified spontaneous emission noise;

or, the linear noise component includes: a transmitter noise, or a transmitter noise and an optical fiber transmission linear distortion; the nonlinear noise component includes: an optical fiber transmission intra-channel nonlinear distortion, an optical fiber transmission inter-channel nonlinear distortion and a receiver noise; and the constant noise component includes: an amplified spontaneous emission noise.

In the embodiment, the first power includes first base channel calibration power and first neighboring channel calibration power, and the second power includes second base channel power and second neighboring channel power.

In the embodiment, the central processing unit 420 may be configured to, when the first noise component is a linear noise component, take a product of a ratio of the second base channel power to the first base channel calibration power and the first noise component as the second noise components; take a product of a power of three of a ratio of the second base channel power to the first base channel calibration power and the first noise component as the second noise component when the first noise component is an optical fiber transmission intra-channel nonlinear distortion, take a product of a square of a ratio of the second neighboring channel power to the first neighboring channel calibration power and a ratio of the second base channel power to the first base channel calibration power and the first noise component as the second noise component when the first noise component is an optical fiber transmission inter-channel nonlinear distortion, and take a product of a power of $\alpha$ of a ratio of the second base channel power to the first base channel calibration power and the first noise component as the second noise component when the first noise component is a receiver noise; where, $\alpha$ is not 1 and 0; and take the first noise component as the second noise component when the first noise component is a constant noise component.

In the embodiment, the system performance is an SNR, or a bit error rate, or a Q value.

In the embodiment, the central processing unit 420 may be configured to, when the system performance is an SNR, take a ratio of second base channel power to a sum of at least one second noise component as the SNR; and in the embodiment, the second power includes the second base channel power and second neighboring channel power.

Embodiment 1 may be referred to for an implementation of the central processing unit 420, which shall not be described herein any further.

In another implementation, the above system performance prediction apparatus may also be configured on a chip (not shown) connected to the central processing unit 420, with its functions being executed under control of the central processing unit 420

It should be noted that the apparatus 400 does not necessarily include all the parts shown in FIG. 4, and furthermore, the c apparatus 400 may include parts not shown in FIG. 4, and the related art may be referred to.

With the above apparatus of this embodiment, by changing power and predicting the system performance by using noise components at different power, accuracy of the prediction of the system performance may be improved, and problems in the related art may be avoided that in predicting system performance, a large-capacity database needs to be prepared and accuracy of the prediction of the system performance is low.

Embodiment 4

Embodiment 4 of this disclosure provides a system performance prediction method. As a principle of the method for solving problems is similar to that of the apparatus in Embodiment 1 or 2, the implementation of the apparatus in Embodiment 1 or 2 may be referred to for implementation of the method, with identical contents being not going to be described herein any further.

FIG. 5 is a flowchart of the system performance prediction method of this embodiment. Referring to FIG. 5, the method includes:

step 501: system performance at second power is calculated according to first power of a signal and a first noise component generated by the system at the first power.

FIG. 6 is a flowchart of step 501. As shown in FIG. 6, step 601: at least one second noise component is calculated at the second power according to the first power of the signal and at least one first noise component at the first power; and step 602: the system performance at the second power is calculated according to the at least one second noise component.

In this embodiment, the system performance prediction apparatus in embodiments 1 and 2 may be referred to for implementations of steps 501 and 601-602, which shall not be described herein any further.

In this embodiment, embodiments 1 and 2 may be referred to for implementations of the first noise component, the second noise component, the first power and the second power, which shall not be described herein any further.

With the above method of this embodiment, by changing power and predicting the system performance by using noise components at different power, accuracy of the prediction of the system performance may be improved, and problems in the related art may be avoided that in predicting system performance, a large-capacity database needs to be prepared and accuracy of the prediction of the system performance is low.

An embodiment of the present disclosure further provides a computer readable program code, which, when executed in a system performance prediction apparatus, will cause a computer unit to carry out the system performance prediction method described in Embodiment 4 in the system performance prediction apparatus.

An embodiment of the present disclosure provides a computer readable medium, including a computer readable program code, which will cause a computer unit to carry out the system performance prediction method described in Embodiment 4 in a system performance prediction apparatus.

The system performance prediction method in the system performance prediction apparatus described in conjunction with the embodiments of this disclosure may be directly embodied as hardware, software modules executed by a processor, or a combination thereof. For example, one or more functional block diagrams and/or one or more combinations of the functional block diagrams shown in FIGS. 1-4 may either correspond to software modules of procedures of a computer program, or correspond to hardware modules. Such software modules may respectively correspond to the steps shown in FIGS. 5-6. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A non-transitory computer readable storage memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a system performance prediction, and may also be stored in a memory card of a pluggable system performance prediction apparatus.

One or more functional blocks and/or one or more combinations of the functional blocks in FIGS. 1-4 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams shown in FIGS. 1-4 may also be realized as a combination of computing equipment, such as a combination of a DSP and a microprocessor, multiple processors, one or more microprocessors in communications combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of the present disclosure containing the above embodiments, following supplements are further disclosed.

Supplement 1. A system performance prediction apparatus, including:
a calculating unit configured to calculate system performance at second power according to first power of a signal and a first noise component generated by the system at the first power.

Supplement 2. The apparatus according to supplement 1, wherein the calculating unit includes:
a noise component calculating unit configured to calculate at least one second noise component at the second power according to the first power of the signal and at least one first noise component at the first power; and
a system performance calculating unit configured to calculate the system performance at the second power according to the at least one second noise component.

Supplement 3. The apparatus according to supplement 2, wherein the at least one first noise component and the at least one second noise component include a linear noise component, a nonlinear noise component, and/or a constant noise component.

Supplement 4. The apparatus according to supplement 3, wherein the linear noise component includes: a transmitter noise, or a transmitter noise and an optical fiber transmission linear distortion; the nonlinear noise component includes: an optical fiber transmission intra-channel nonlinear distortion and an optical fiber transmission inter-channel nonlinear distortion; and the constant noise component includes: an amplified spontaneous emission noise, or an amplified spontaneous emission noise and a receiver noise;
or, the linear noise component includes: a transmitter noise and a receiver noise, or a transmitter noise, a receiver noise and an optical fiber transmission linear distortion; the nonlinear noise component includes: an optical fiber transmission intra-channel nonlinear distortion and an optical fiber transmission inter-channel nonlinear distortion; and the constant noise component includes: an amplified spontaneous emission noise;
or, the linear noise component includes: a transmitter noise, or a transmitter noise and an optical fiber transmission linear distortion; the nonlinear noise component includes: an optical fiber transmission intra-channel nonlinear distortion, an optical fiber transmission inter-channel nonlinear distortion and a receiver noise; and the constant noise component includes: an amplified spontaneous emission noise.

Supplement 5. The apparatus according to supplement 4, wherein the first power includes first base channel calibration power and first neighboring channel calibration power, and the second power includes second base channel power and second neighboring channel power;
and wherein, the noise component calculating unit includes:
a linear noise component calculating unit configured to take a product of a ratio of the second base channel power to the first base channel calibration power and the first noise component as the second noise component when the first noise component is a linear noise component;
and/or,
a nonlinear noise component calculating unit configured to take a product of a power of three of a ratio of the second base channel power to the first base channel calibration power and the first noise component as the second noise component when the first noise component is an optical fiber transmission intra-channel nonlinear distortion, take a product of a square of a ratio of the second neighboring channel power to the first neighboring channel calibration power and a ratio of a second base channel power to the first base channel calibration power and the first noise component as the second noise component when the first noise component is an optical fiber transmission inter-channel nonlinear distortion, and take a product of a power of α of a ratio of the second base channel power to the first base channel calibration power and the first noise component as the second noise component when the first noise component is a receiver noise; where, α is not 1 and 0;
and/or,
a constant noise component calculating unit configured to take the first noise component as the second noise component when the first noise component is a constant noise component.

Supplement 6. The apparatus according to supplement 1, wherein the system performance is a signal to noise ratio, or a bit error rate, or a Q value.

Supplement 7. The apparatus according to supplement 2, wherein when the performance is a signal to noise ratio, the system performance calculating unit takes a ratio of second base channel power to a sum of at least one second noise component as the signal to noise ratio; and wherein, the second power includes the second base channel power and second neighboring channel power.

Supplement 8. A system performance prediction method, including:
calculating system performance at second power according to first power of a signal and a first noise component generated by the system at the first power.

Supplement 9. The method according to supplement 8, wherein the calculating system performance at second power according to first power of a signal and a first noise component generated by the system at the first power includes:

calculating at least one second noise component at the second power according to the first power of the signal and at least one first noise component at the first power; and calculating the system performance at the second power according to the at least one second noise component.

Supplement 10. The method according to supplement 9, wherein the at least one first noise component and the at least one second noise component include a linear noise component, a nonlinear noise component, and/or a constant noise component.

Supplement 11. The method according to supplement 10, wherein the linear noise component includes: a transmitter noise, or a transmitter noise and an optical fiber transmission linear distortion; the nonlinear noise component includes: an optical fiber transmission intra-channel nonlinear distortion and an optical fiber transmission inter-channel nonlinear distortion; and the constant noise component includes: an amplified spontaneous emission noise, or an amplified spontaneous emission noise and a receiver noise;

or, the linear noise component includes: a transmitter noise and a receiver noise, or a transmitter noise, a receiver noise and an optical fiber transmission linear distortion; the nonlinear noise component includes: an optical fiber transmission intra-channel nonlinear distortion and an optical fiber transmission inter-channel nonlinear distortion; and the constant noise component includes: an amplified spontaneous emission noise;

or, the linear noise component includes: a transmitter noise, or a transmitter noise and an optical fiber transmission linear distortion; the nonlinear noise component includes: an optical fiber transmission intra-channel nonlinear distortion, an optical fiber transmission inter-channel nonlinear distortion and a receiver noise; and the constant noise component includes: an amplified spontaneous emission noise.

Supplement 12. The method according to supplement 11, wherein the first power includes first base channel calibration power and first neighboring channel calibration power, and the second power includes second base channel power and second neighboring channel power;

and wherein, the calculating at least one second noise component at the second power according to the first power of the signal and at least one first noise component at the first power includes:

taking a product of a ratio of the second base channel power to the first base channel calibration power and the first noise component as the second noise component when the first noise component is a linear noise component;

taking a product of a power of three of a ratio of the second base channel power to the first base channel calibration power and the first noise component as the second noise component when the first noise component is an optical fiber transmission intra-channel nonlinear distortion, taking a product of a square of a ratio of the second neighboring channel power to the first neighboring channel calibration power and a ratio of the second base channel power to the first base channel calibration power and the first noise component as the second noise component when the first noise component is an optical fiber transmission inter-channel nonlinear distortion, and taking a product of a power of $\alpha$ of a ratio of the second base channel calibration power and the first noise component as the second noise component when the first noise component is a receiver noise; where, $\alpha$ is not 1 and 0;

taking the first noise component as the second noise component when the first noise component is a constant noise component.

Supplement 13. The method according to supplement 8, wherein the system performance is a signal to noise ratio, or a bit error rate, or a Q value.

Supplement 14. The method according to supplement 9, wherein when the performance is a signal to noise ratio, a ratio of second base channel power to a sum of at least one second noise component is taken as the signal to noise ratio; and wherein, the second power includes the second base channel power and second neighboring channel power.

Although a few embodiments have been shown and described, it would be appreciated by those skilled in the art that changes may be made in these embodiments without departing from the principles and spirit thereof, the scope of which is defined in the claims and their equivalents.

What is claimed is:

1. An apparatus, used to calculate transmission system performance, comprising:
    a memory that stores a plurality of instructions; and
    a processor coupled to the memory and configured to execute the plurality of instructions to:
        calculate at least one second noise component at a second power according to a first power of a signal and at least one first noise component generated by the transmission system at the first power; and
        calculate the transmission system performance at the second power according to the at least one second noise component,
    wherein the first power includes a first base channel calibration power and a first neighboring channel calibration power, and the second power includes a second base channel power and a second neighboring channel power; and
    wherein, the processor configured to execute the plurality of instructions to one of:
        take a product of a ratio of the second base channel power to the first base channel calibration power and the first noise component as the second noise component when the first noise component is a linear noise component;
        take a product of a power of three of a ratio of the second base channel power to the first base channel calibration power and the first noise component as the second noise component when the first noise component is an optical fiber transmission intra-channel nonlinear distortion, take a product of a square of a ratio of the second neighboring channel power to the first neighboring channel calibration power and a ratio of a second base channel power to the first base channel calibration power and the first noise component as the second noise component when the first noise component is an optical fiber transmission inter-channel nonlinear distortion, and take a product of a power of $\alpha$ of a ratio of the second base channel power to the first base channel calibration power and the first noise component as the second noise component when the first noise component is a receiver noise; where, $\alpha$ is not 1 and 0; and
        take the first noise component as the second noise component when the first noise component is a constant noise component.

2. The apparatus according to claim 1, wherein the at least one first noise component and the at least one second noise component include one of a linear noise component, a nonlinear noise component, and a constant noise component.

3. The apparatus according to claim 1, wherein the transmission system performance is at least one of a signal to noise ratio, or a bit error rate, or a Q value.

4. The apparatus according to claim 2, wherein when the transmission system performance is a signal to noise ratio, the processor is configured to execute the plurality of instructions to: use a ratio of a second base channel power to a sum of at least one second noise component as the signal to noise ratio, and
wherein, the second power includes the second base channel power and a second neighboring channel power.

5. The apparatus according to claim 1, wherein the at least one first noise component and the at least one second noise component include two of a linear noise component, a nonlinear noise component, a constant noise component.

6. The apparatus according to claim 1, wherein the at least one first noise component and the at least one second noise component include a linear noise component, a nonlinear noise component, and a constant noise component.

7. The apparatus according to any one of claim 2, 5 or 6, wherein
the linear noise component includes one of: a transmitter noise, or a transmitter noise and an optical fiber transmission linear distortion;
the nonlinear noise component includes: an optical fiber transmission intra-channel nonlinear distortion and an optical fiber transmission inter-channel nonlinear distortion;
the constant noise component includes: an amplified spontaneous emission noise, or an amplified spontaneous emission noise and a receiver noise; a transmitter noise and a receiver noise, or a transmitter noise, a receiver noise and an optical fiber transmission linear distortion;
the nonlinear noise component includes: an optical fiber transmission intra-channel nonlinear distortion and an optical fiber transmission inter-channel nonlinear distortion; and
the constant noise component includes: an amplified spontaneous emission noise; and, a transmitter noise, or a transmitter noise and an optical fiber transmission linear distortion;
the nonlinear noise component includes: an optical fiber transmission intra-channel nonlinear distortion, an optical fiber transmission inter-channel nonlinear distortion and a receiver noise; and
the constant noise component includes: an amplified spontaneous emission noise.

8. A transmission system performance prediction method, including:
calculating, by a processor in an apparatus, at least one second noise component at a second power according to a first power of a signal and at least one first noise component generated by the transmission system at the first power; and
calculating, by the processor in the apparatus, the transmission system performance at the second power according to at least one second noise component;
wherein the first power includes a first base channel calibration power and a first neighboring channel calibration power, and the second power includes a second base channel power and a second neighboring channel power; and wherein, the calculating at least one second noise component at the second power according to the first power of the signal and at least one first noise component at the first power includes one of:
taking, by the processor in the apparatus, a product of a ratio of the second base channel power to the first base channel calibration power and the first noise component as the second noise component when the first noise component is a linear noise component;
taking, by the processor in the apparatus, a product of a power of three of a ratio of the second base channel power to the first base channel calibration power and the first noise component as the second noise component when the first noise component is an optical fiber transmission intra-channel nonlinear distortion, taking a product of a square of a ratio of the second neighboring channel power to the first neighboring channel calibration power and a ratio of the second base channel power to the first base channel calibration power and the first noise component as the second noise component when the first noise component is an optical fiber transmission inter-channel nonlinear distortion, and taking a product of a power of $\alpha$ of a ratio of the second base channel power to the first base channel calibration power and the first noise component as the second noise component when the first noise component is a receiver noise; where, $\alpha$ is not 1 and 0; and
taking, by the processor in the apparatus, the first noise component as the second noise component when the first noise component is a constant noise component.

9. The method according to claim 8, wherein the at least one first noise component and the at least one second noise component include one of a linear noise component, a nonlinear noise component, and a constant noise component.

10. The method according to claim 8, wherein the at least one first noise component and the at least one second noise component include two of a linear noise component, a nonlinear noise component, a constant noise component.

11. The method according to claim 8, wherein the at least one first noise component and the at least one second noise component include a linear noise component, a nonlinear noise component, and a constant noise component.

12. The method according to any of claim 9, 10 or 11, wherein
the linear noise component includes one of: a transmitter noise, or a transmitter noise and an optical fiber transmission linear distortion;
the nonlinear noise component includes: an optical fiber transmission intra-channel nonlinear distortion and an optical fiber transmission inter-channel nonlinear distortion;
the constant noise component includes: an amplified spontaneous emission noise, or an amplified spontaneous emission noise and a receiver noise; a transmitter noise and a receiver noise, or a transmitter noise, a receiver noise and an optical fiber transmission linear distortion;
the nonlinear noise component includes: an optical fiber transmission intra-channel nonlinear distortion and an optical fiber transmission inter-channel nonlinear distortion; and
the constant noise component includes: an amplified spontaneous emission noise; and a transmitter noise, or a transmitter noise and an optical fiber transmission linear distortion;

the nonlinear noise component includes: an optical fiber transmission intra-channel nonlinear distortion, an optical fiber transmission inter-channel nonlinear distortion and a receiver noise; and the constant noise component includes: an amplified spontaneous emission noise.

13. The method according to claim 8, wherein the transmission system performance is at least one of a signal to noise ratio, or a bit error rate, or a Q value.

14. The method according to claim 8, wherein when the transmission system performance is a signal to noise ratio, a ratio of second base channel power to a sum of at least one second noise component is taken as the signal to noise ratio; and wherein, the second power includes the second base channel power and second neighboring channel power.

15. A non-transitory computer readable storage medium storing a method according to claim 8 for controlling a computer.

* * * * *